Dec. 5, 1961 J. E. DEMAREE ET AL 3,011,792

PHONOGRAPH

Filed May 14, 1959 2 Sheets-Sheet 1

INVENTORS.
JOHN E. DEMAREE
WILLIAM MACPHERSON
BY
Christie, Parker & Hale
ATTORNEYS Dec. 5, 1961 J. E. DEMAREE ET AL 3,011,792

PHONOGRAPH

Filed May 14, 1959 2 Sheets-Sheet 2

INVENTORS
JOHN E. DEMAREE
WILLIAM MACPHERSON

BY Christie, Parker & Hale
ATTORNEYS 3,011,792

PHONOGRAPH

John E. Demaree, 516 Monterey Road, South Pasadena, Calif., and William MacPherson, 240 E. Fillmore St., Pasadena, Calif.; said MacPherson assignor to said Demaree Filed May 14, 1959, Ser. No. 813,205
7 Claims. (Cl. 274—23)

This invention relates to sound reproduction from disk type phonograph records, and more particularly, to improved tone arms used in such devices to carry a pickup head.

In a typical phonograph, a record or disk having a spiral groove is rotated on a horizontal turntable. A phonograph pickup head having a downwardly extending needle or stylus is connected to one end of an elongated horizontal arm disposed above the record so the needle or stylus follows the grooves in the record. The other end of the arm is secured to a frame or support to pivot about an upright axis so the arm can swing the pickup head laterally in a horizontal plane to follow the spiral groove on the record. With such an arrangement, the head and needle are caused to travel an arcuate path, with the center of the radius of curvature being at the pivot point on the arm. Arcuate type of travel of the needle is undesirable. It prevents accurate tracking of the needle in the sound groove, resulting in distortion of sound reproduction, and excessive wear of the needle and sound groove.

This invention provides a tone arm in which the pickup head and needle are mounted on an arm so as to track along a rectilinear path, so that the needle is shifted in a direction normal to the sound grooves of the record, thereby reducing to zero the component of the needle motion in the direction of the sound groove to reduce distortion and reproduce sound and decrease wear on both the needle and the sound groove.

Briefly, the invention includes a frame on which an upright beam is mounted to pivot about a substantially horizontal axis. An elongated arm is connected to the beam at a point spaced from the said pivot axis. The phonograph pickup head is attached to the arm at a point spaced from the connection of the arm to the beam. Thus, the beam is free to pivot in a substantially vertical plane and move the pickup head along a rectilinear path parallel to the plane in which the beam pivots.

The vertical movement of the portion of the arm connected to the beam is suitably compensated for to prevent the head and needle from being raised and lowered as the pickup head is moved along a rectilinear path. In the preferred form of the invention, the arm is connected to the beam through a gimballed joint so that the arm is free to pivot with respect to the beam about two mutually perpendicular horizontal axes, one of the axes being substantially parallel to that about which the beam pivots with respect to the frame.

In another form, the arm is of sufficient length and flexibility so that the weight of the head maintains the stylus in a horizontal plane as the arm is moved rectilinearly by the motion of the head.

These and other aspects of the invention will be more fully understood from the following detailed description taken in conjunction with the accompanying drawings in which.

Figure 1:
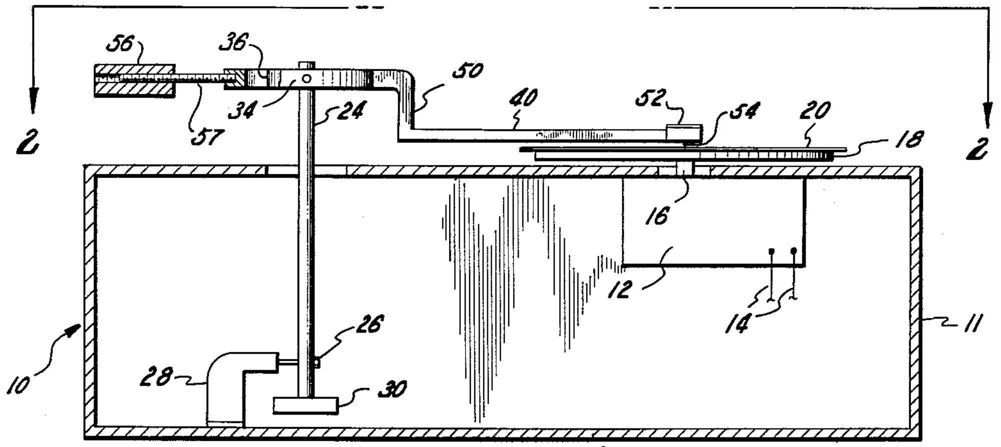
FIG. 1 is a vertical section of the presently preferred embodiment of the invention.
Figure 2:
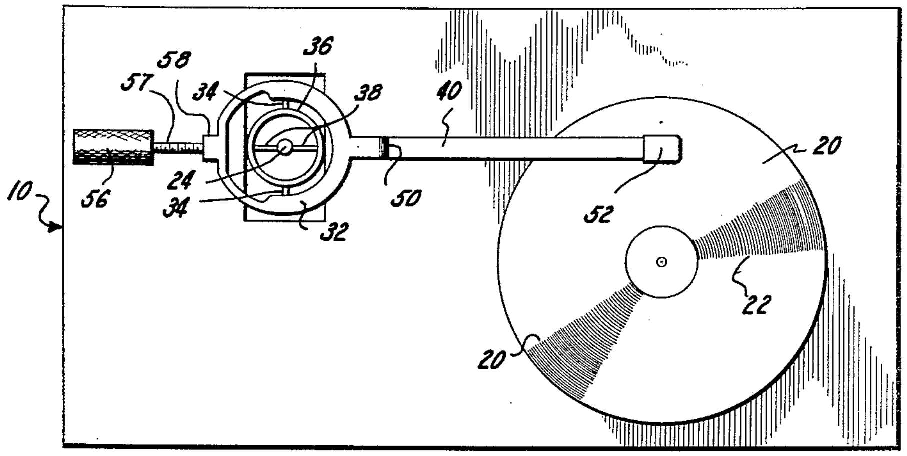
FIG. 2 is a view taken on line 2—2 of FIG. 1.

Referring to FIGS. 1 and 2, a phonograph 10 includes an enclosed box 11 of generally rectangular shape. A motor 12 is mounted on the inside of the box and is supplied power through lead lines 14 by conventional means (not shown). A vertical drive shaft 16 extends from the motor up through the top of the box and is connected to the underside of a horizontal turntable 18 on which is disposed a disk-type record 20 having a spiral sound groove 22 cut in its upper surface.

A substantially upright beam 24 is secured by a horizontal pivot pin 26 adjacent its lower end to a bracket 28 mounted inside the bottom of the box. A counterweight 30 is attached to the lower end of the beam below the pivot pin 26.

A yoke 32 is connected by a pair of lateral pivot pins 34 to a ring 36 which in turn is connected by a pair of longitudinal pivot pins 38 to the upper end of the beam 24. One end of an elongated and horizontal arm 40 is connected to a downwardly extending leg 50 formed integrally with the yoke. A pickup head 52 is connected to the opposite end of the horizontal arm, and includes a downwardly extending needle or stylus 54 disposed to ride in the sound groove of the record on a line which is parallel to the vertical plane defined by beam 24 and passing through the turntable drive shaft 16.

The operation of the device of FIGS. 1 and 2 is as follows:

The motor is turned on by a suitable switch (not shown) to cause the turntable to turn in a clockwise direction (as viewed in FIG. 2). The beam is pivoted so that the pickup head and stylus are moved to the edge of the record (upper edge as viewed in FIG. 2), and the needle is placed in the beginning of the sound groove. As the record revolves, the needle is forced to vibrate and follows the sound groove, and the vibrations are picked up by a suitable transducer (not shown) and fed to a suitable amplifier and speaker system (not shown). As the record turns, the pickup head and needle move inwardly toward the position shown in FIG. 2. The beam pivots in a vertical plane as the head moves, and permits the head and stylus to follow a rectilinear path so there is no movement of the needle in the direction of the sound groove. The counterweight 30 on the lower end of the beam reduces materially the force required to move the beam, thereby further decreasing the wear on the record and the needle. Tracking has been successfully achieved with head masses of less than one gram.

The lateral pivot pins 34 connecting the yoke to the ring 36 permit the arm to pivot in a vertical plane perpendicular to the vertical plane in which the beam travels, and compensate for the small variation in elevation of the yoke produced by the pivoting of the beam. The longitudinal pivot pins 38 connecting the ring to the upper end of the beam 24 permit the arm to pivot about the axis defined by the pins so that the head and needle are not tilted or canted as the beam is pivoted. The mass of the arm is located below the pivot pins 34 and 38, and tends to hold leg 50 in a vertical position, thereby keeping the pickup head and stylus properly oriented with respect to the record. The longitudinal pins 38 also prevent the arm from pivoting in a horizontal plane with respect to the beam, thereby avoiding any arcuate movement of the pickup head or stylus.

An adjustable arm counterweight 56 movable along a threaded stud 57 suspended from the rearward portion 58 of yoke 32 in axial alignment with arm 40 and pickup head 52 provides means for adjusting the load imposed on the record by the arm and the head.

Figure 3:
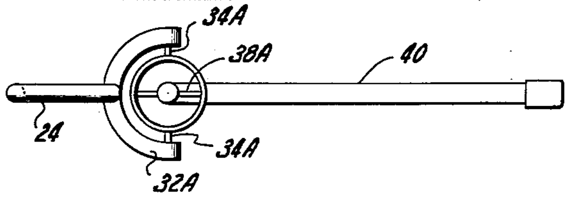
FIG. 3 is a fragmentary plan view of an alternate form for gimballing the arm of the embodiment of FIG. 1.

FIG. 3 illustrates an embodiment of the invention similar to that of FIGS. 1 and 2 but having a gimballed mount at the juncture of arm 40 and downwardly extending leg 50. In this embodiment the ring 36A is pivotally mounted to arm 40 by a pin 38A. Leg 50 has a yoke 32A connected to the ring by pivot pins 34A aligned transversely to pin 38A.

The embodiment of FIG. 3 may be provided with an adjustable arm counterbalance similar to that shown in FIG. 1.

Figure 4:
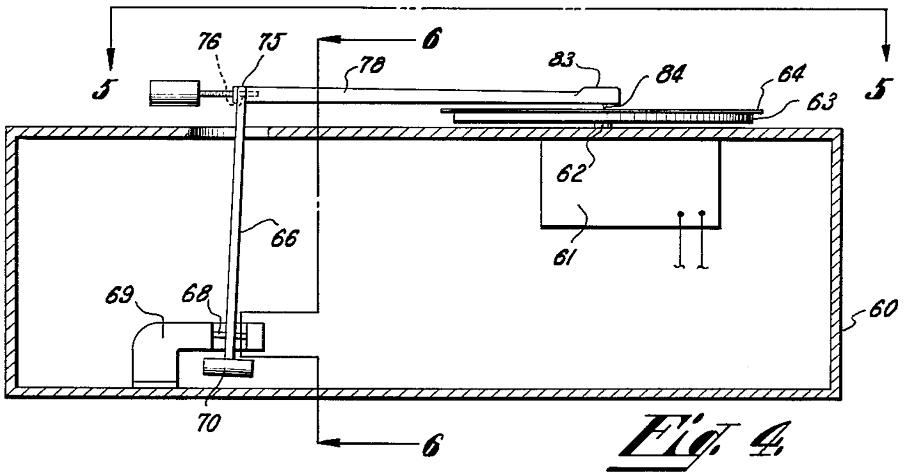
FIG. 4 is a vertical section of an alternate embodiment of the invention.
Figure 5:
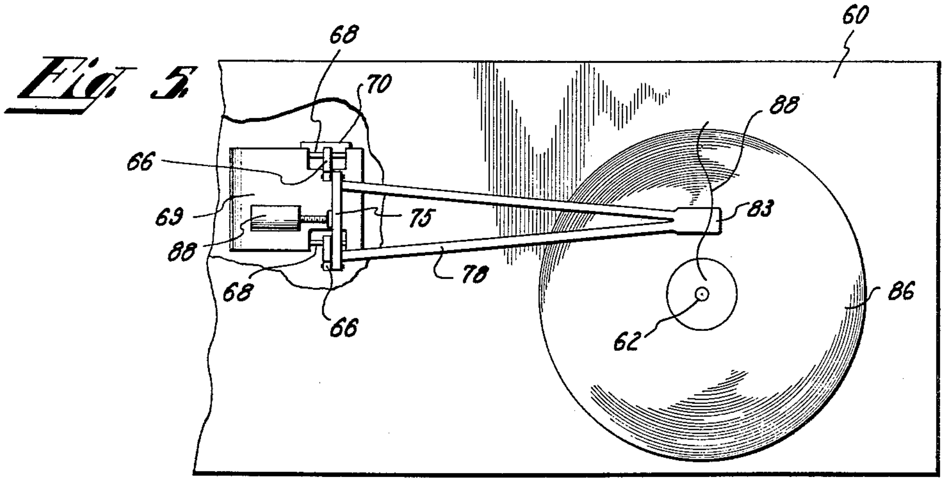
FIG. 5 is a view taken on line 5—5 of FIG. 4.
Figure 6:
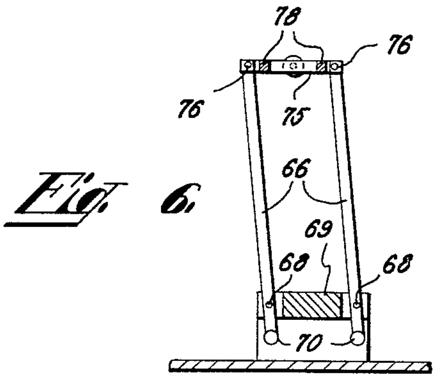
FIG. 6 is a view taken on line 6—6 of FIG. 4.

The alternate embodiment shown in FIGS. 4 through 6 includes a box 60, a motor 61, a drive shaft 62 extending up through the box and on which is mounted a turntable 63. A record 64 is mounted on the turntable.

A pair of parallel and upright beams 66 are each connected by a respective pivot pin 68 to a bracket 69 mounted in the bottom of the box. The pivot pins 68 are parallel and substantially horizontal. A separate respective counterweight 70 is attached to the lower end of each of the beams 66.

A crossbar 75 is secured by horizontal and parallel pivots 76 to the upper ends of the beams 66. The pivots 76 are substantially parallel to pivot pins 68.

A pair of enlongated arms 78 are connected at laterally spaced locations to the crossbar 75 and taper together in the direction of the turntable. The arms are connected over the turntable to a pickup head 83 which includes a downwardly extending stylus 84 that rides in a sound groove 86 of the record.

The operation of the device of FIGS. 4 through 6 is similar to that described for FIGS. 1 through 3. The motor is turned on and the needle is placed in the sound groove as previously described. As the record turns, the needle and pickup head are carried toward the position shown in FIG. 4, the beams 66 pivoting in a vertical plane. The counterweights 70 aid in pivoting the beams so that a minimum amount of force is required. The arms are sufficiently long and of sufficient lateral flexibility in the vertical direction that the weight of the head maintains the needle in contact with the record with approximately the same bearing force during the entire tracking procedure. The lateral spacing of the arms and the crossbar prevent canting of the pickup head and needle as the needle tracks in the sound groove. The vertical movement of the upper ends of the pins can also be compensated for by mounting the arms 78 to the crossbar by suitable horizontal pivots extending perpendicular to the pivots 76 so that the arm need not be flexible at all. The force of the pickup head on the record may be changed by an adjustable counterweight 88 mounted to crossbar 75 in axial alignment with pickup head 83.

A U-shaped channel cantilever may be substituted for the diverging arms of the embodiment of FIGS. 4 through 6. The channel may extend across crossbar 75 remote from the pickup head to provide a shielded mounting for an adjustable counterbalance weight.

The amount of "lift" transmitted to the pickup head by the arcuate path of the beam is compensated for in the embodiment of FIGS. 4 through 6 by the flexibility of the arms. An alternate means of overcoming the tendency of the beams to lift the pickup head away from the record surface, or to cause it to traverse an arc across the record, is to cant the beams of the device slightly from the vertical toward the turntable, as shown in FIG. 4. This can be accomplished by mounting pivot pins 68 to deviate slightly from a horizontal line. The cant tends to alter the previously described arcuate path of the pickup head within a vertical plane toward the pivot point of the record. The path of the pickup head departs slightly from a rectilinear path in a substantially sinusoidal motion defined by line 88 with practically no upward component. The line exaggerates the actual motion for the purposes of clarity.

It will be appreciated from the foregoing description that the invention provides a simple, inexpensive, and yet effective tone arm mechanism for providing rectilinear tracking of a sound groove in a disk-type record, thereby improving fidelity of sound reproduction, and reducing wear on both needles and records.

We claim:

1. A phonograph tone arm mechanism for reproducing sound from disk type records, the mechanism comprising a frame, an upright beam mounted on the frame to pivot about a substantially horizontal axis, an elongated arm pivotally connected to the beam at a point spaced from the said pivot axis, and a phonograph pickup head attached to the arm at a point spaced from the pivotal connection of the arm to the beam.

2. A phonograph tone arm mechanism for reproducing sound from disk type records, the mechanism comprising a frame, an upright beam mounted on the frame to pivot in a substantially vertical plane, an elongated arm pivotally connected to the beam at a point spaced from the said pivot axis to pivot about at least a substantially horizontal axis and extending transverse to the said vertical plane, and a phonograph pickup head attached to the arm at a point spaced from the pivotal connection of the arm to the beam.

3. A phonograph tone arm mechanism for reproducing sound from disk type records, the mechanism comprising a frame, an upright beam mounted on the frame to pivot about a first substantially horizontal axis, an elongated arm, a substantially horizontal pivot connecting the arm to the beam at a point spaced from the said first pivot axis, and a phonograph pickup head attached to the arm at a point spaced from the connection of the arm to the beam.

4. A phonograph tone arm mechanism for reproducing sound from disk type records, the mechanism comprising a frame, an upright beam mounted on the frame to pivot about a first substantially horizontal axis, an elongated arm, means connecting the arm to the beam at a point spaced from the said first pivot axis to permit the arm to pivot with respect to the beam about two transverse and substantially horizontal axes, and a phonograph pickup head attached to the arm at a point spaced from the connection of the arm to the beam.

5. Apparatus according to claim 4 in which the center of gravity of the arm is disposed below the means connecting it to the beam.

6. A phonograph tone arm mechanism for reproducing sound from disk type records, the mechanism comprising a frame, an elongated and upright beam mounted intermediate its ends on the frame to pivot about a first substantially horizontal axis, a counterbalancing weight attached to the beam below the said first axis, an elongated arm pivotally connected to the beam at a point spaced from the said pivot axis to pivot about at least a substantially horizontal axis, and a phonograph pickup head attached to the arm at a point spaced from the pivotal connection of the arm to the beam.

7. A phonograph tone arm mechanism for reproducing sound from disk type records, the mechanism comprising a frame, a pair of laterally spaced and upright beams each mounted on the frame to pivot about a respective substantially horizontal axis, an elongated arm, means connecting the arm to the beam to permit the arm to pivot in a substantially vertical plane with respect to the beams, and a phonograph pickup head attached to the arm at a point spaced from the connection of the arm to the beams.

References Cited in the file of this patent

UNITED STATES PATENTS 2,219,230 Krause ---------------- Oct. 22, 1940